(12) United States Patent
Sari

(10) Patent No.: US 10,608,862 B2
(45) Date of Patent: Mar. 31, 2020

(54) NOMA SCHEME

(71) Applicant: Sequans Communications S.A., Colombes (FR)

(72) Inventor: Hikmet Sari, Colombes (FR)

(73) Assignee: Sequans Communications S.A., Colombes (FR)

(*) Notice: Subject to any disclaimer, the term of this patent is extended or adjusted under 35 U.S.C. 154(b) by 0 days.

(21) Appl. No.: 15/937,765

(22) Filed: Mar. 27, 2018

(65) Prior Publication Data

US 2019/0306001 A1 Oct. 3, 2019

(51) Int. Cl.
*H04L 5/12* (2006.01)
*H04L 27/34* (2006.01)
*H04B 1/10* (2006.01)
*H04L 5/00* (2006.01)

(52) U.S. Cl.
CPC ....... *H04L 27/3405* (2013.01); *H04B 1/1027* (2013.01); *H04L 5/0005* (2013.01); *H04L 27/3488* (2013.01)

(58) Field of Classification Search
CPC ............... H04L 27/3405; H04L 5/0005; H04L 27/3488; H04B 1/1027
USPC ................ 375/261, 260, 259, 316, 219, 295
See application file for complete search history.

(56) References Cited

U.S. PATENT DOCUMENTS

| | | | |
|---|---|---|---|
| 2015/0010104 A1* | 1/2015 | Park | H04B 7/0456 375/295 |
| 2016/0100414 A1* | 4/2016 | Guvenkaya | H04L 27/2697 370/329 |
| 2018/0076993 A1* | 3/2018 | Seo | H04L 27/26 |
| 2018/0205503 A1* | 7/2018 | Chen | H04L 1/18 |
| 2019/0028238 A1* | 1/2019 | Kimura | H04J 7/02 |

OTHER PUBLICATIONS

Hikmet, S., "Multiple Access Using Two Sets of Orthogonal Signal Waveforms," IEEE Communications Letters vol. 4, Issue: 1, pp. 1-3 (2000).

Maatouk, A., et al., "Frequency-Domain NOMA with Two Sets of Orthogonal Signal Waveforms," IEEE Communications Letters, 22(5): 906-909 (May 2018).

* cited by examiner

*Primary Examiner* — Zewdu A Kassa
(74) *Attorney, Agent, or Firm* — Hamilton, Brook, Smith & Reynolds, P.C.

(57) ABSTRACT

A method of transmission for increasing communication channel capacity comprising superposing a first signal on a portion of a second signal to form a combined signal, wherein the first signal comprises a repetition coded signal, and transmitting the combined signal. Also disclosed is a method of receiving a combined signal for increasing communication channel capacity comprising performing threshold detection on the combined signal wherein the combined signal comprises a first signal comprising a repetition coded signal superposed on a portion of a second signal and the threshold detection enables derivation of the second signal and the first signal prior to repetition coding.

11 Claims, 3 Drawing Sheets

NOMA SCHEME

TECHNICAL FIELD

This disclosure relates to the increasing communication channel capacity of a NOMA scheme by way of signal combination at a transmitter and de-combination at a receiver. It is particularly suited, but by no means limited, to a QPSK signal superposed onto a 16QAM signal.

BACKGROUND

Non-Orthogonal Multiple Access (NOMA) is able, in principle, to achieve a higher throughput than orthogonal multiple access (OMA), which includes conventional multiple access schemes like time division multiple access (TDMA), Orthogonal code division multiple access (OCDMA), and Orthogonal frequency division multiple access (OFDMA). Recently, NOMA gained a significant interest in the technical community and in standardization for 5G cellular networks and beyond. Following the trend of 4G, the 3GPP has decided that multiple access for Enhanced Mobile Broadband (eMBB) and Ultra-Reliable Low-Latency Communications (URLLC) traffic in 5G will be based on OFDMA, but NOMA still stands as a strong candidate for Massive Machine-Type Communications (mMTC).

A common feature of NOMA schemes is to multiplex user signals in the power domain, i.e., to superpose two or more user signals and transmit them during the same time slot and the same frequency band. Another common feature is the use of successive interference cancellation (SIC) to handle the resulting interference. FIG. 1 illustrates an example of a downlink with NOMA.

In this example, User 2 signal (11) has a higher power than User 1 signal (10), and therefore User 2 (12) can detect its signal in the presence of interference from User 1 (13). But User 1 cannot detect its signal directly. User 1 must first detect the strong signal of User 2, subtract this from the received signal, and then detect its signal in the presence of residual interference (using SIC 14) from User 2. This scheme imposes a strong power imbalance between user signals so that the SIC receiver (14) can work properly. The bit error rate (BER) performance will be far from that achievable in the absence of interference.

Another NOMA technique uses two sets of orthogonal signal waveforms that are stacked (added) together to accommodate two groups of users. The stacking is such that no interference arises between users of the same group, but each user is subject to interference from all users of the other group. Two-stage iterative interference cancellation is used to handle the noise between the two groups as would be understood. For example, the first signal set (the primary signal set) is used in full, and the second signal set is used only partially. In a first stage, preliminary decisions are made on the symbols transmitted by primary set users in the presence of interference from secondary set users. In a second stage, the interference of primary set users is synthesized based on these decisions and is subtracted from the received signal. After this interference cancellation step, first-iteration decisions are made on the symbols transmitted by secondary set users. Then, the interference of secondary set users is synthesized based on these decisions, it is subtracted from the received signal, and second-iteration decisions are made on the symbols transmitted by first set users, and the process continues in this way. As would be understood, depending on the number of users in the secondary set, two iterations may be sufficient, or 4 to 5 iterations may be required. 'Sufficient' is measured based on how many users we have in the secondary set. For example, if the Primary set is used in full and only a small subset of the secondary set is used, a relatively small number of iterations, for example two may be sufficient to detect all signals. If there are more users with resources from the secondary set, then more iterations might be needed to detect all signals. In the end, a 'sufficient' number of iterations is judged on performance of the interference cancellation.

No power or energy imbalance is required between different user signals with this technique.

A development of this technique is to superpose a plurality of MC-CDMA signals that are spread over the entire band onto OFDMA signals such that each MC-CDMA signal interferes with all OFDMA signals. Iterative interference cancellation is used to deal with that interference as explained above. Mathematical analysis of this technique shows that the number of MC-CDMA symbols spread over N subcarriers should be limited to IN in order to achieve bit error rate (BER) performance close to the BER of the original OFDMA signal. However, even when the number of MC-CDMA symbols complies with this bound, the performance gap from the original OFDMA BER is a function of the number of MC-CDMA symbols superposed to the OFDMA symbols, and this performance degradation is generally not negligible. Another disadvantage is that the two-stage iterative interference cancellation receiver used provides different BER performance results for the original OFDMA symbols and for the MC-CDMA symbols superposed to them. This is because the decisions on the OFDMA symbols (stage 1) are made in the first stage of the receiver, and those on the MC-CDMA (stage 2) symbols are made in the second stage. The interference values affecting these decisions are different, and therefore the performance degradations from the ideal BER curves are also different.

Accordingly, there is a need to provide an improved NOMA scheme whereby communication channel capacity is increased while maintaining signal to noise, and energy performance.

SUMMARY

In a first aspect there is disclosed a method of transmission for increasing communication channel capacity as defined in claim 1. In a second aspect there is disclosed a method of receiving a combined signal for increasing communication channel capacity as defined in claim 12. According to a third aspect there is disclosed a non-transitory computer readable medium comprising computer readable instructions that when executed by a processor, cause the processor to perform the method according to claim 1. According to a fourth aspect there is disclosed a non-transitory computer readable medium comprising computer readable instructions that when executed by a processor, cause the processor to perform the method according to claim 12.

Set out below are a series of clauses that disclose features of further aspects of the invention, which may be claimed. The clauses that refer to one or more preceding clause contain optional features.

A method of transmission for increasing communication channel capacity comprising superposing a first signal on a portion of a second signal to form a combined signal, wherein the first signal comprises a repetition coded signal, and transmitting the combined signal.

The method of clause 1 wherein the portion of the second signal comprises a portion of the subcarriers of the second signal.

The method of clause 1 or 2 wherein the portion of the second signal comprises a portion of the symbol durations of the second signal.

The method of any preceding clause wherein the first signal is amplitude scaled prior to superposing.

The method of any preceding clause wherein the first signal is phase rotated prior to superposing.

The method of clause 4 or 5 wherein the amplitude scaling preserves the symbol energy and minimum Euclidian distance of the original symbol streams.

The method of any preceding clause wherein the repetition code length defines the portion of the second signal that the first signal is superposed on.

The method of any preceding clause wherein the portion comprises a number of symbols of the second signal.

The method of any preceding clause wherein the second signal and the first signal are manipulated in the frequency domain.

The method of any preceding clause wherein the second signal and the first signal are manipulated in the time domain.

The method of any preceding clause wherein only a single symbol of the first signal is superposed on the portion of the second signal.

A method of receiving a combined signal for increasing communication channel capacity comprising:

performing threshold detection on the combined signal wherein the combined signal comprises a first signal comprising a repetition coded signal superposed on a portion of a second signal and the threshold detection enables derivation of the second signal and the first signal prior to repetition coding.

The method of clause 12 wherein the threshold detection is based on the repetition code length of the first signal.

The method of clause 12 or 13 wherein the threshold detection comprises a number of steps based on the repetition code length of the first signal.

The method of any of clauses 12 to 14 wherein the thresholds of the threshold detection are based on the modulation schemes of the second signal and the first signal.

The method of any of clauses 12 to 15 wherein the first signal of the combined signal was amplitude scaled prior to transmission and the thresholds of the threshold detection comprise thresholds of the symbols of the second signal adjusted based on the amplitude scaling factor of the first signal.

The method of any of clauses 12 to 16 wherein the first signal of the combined signal was phase rotated prior to transmission and the thresholds of the threshold detection comprise thresholds of the symbols of the second signal adjusted based on the phase rotation of the first signal.

The method of any of clauses 12 to 17 wherein in each step of the threshold detection, an error signal is calculated comprising the difference between a threshold detector input and the threshold detector output.

A non-transitory computer readable medium comprising computer readable instructions that when executed by a processor, cause the processor to perform the method according to clause 1.

A non-transitory computer readable medium comprising computer readable instructions that when executed by a processor, cause the processor to perform the method according to clause 12.

With all clauses, preferable and optional features are defined in the dependent claims.

BRIEF DESCRIPTION OF THE DRAWINGS

Embodiments will now be described, by way of example only, and with reference to the drawings in which.

In the figures, like elements are indicated by like reference numerals throughout.

DETAILED DESCRIPTION

Overview

In general, NOMA can be considered to be a channel overloading technique. That is to say that the data rate and/or the number of users is increased with respect to standard OFDMA transmission. The following disclosed new technique comprises a new transmission scheme to combine signals for transmission and a new receive scheme to derive the combined signals at a receiver.

Figure 1:
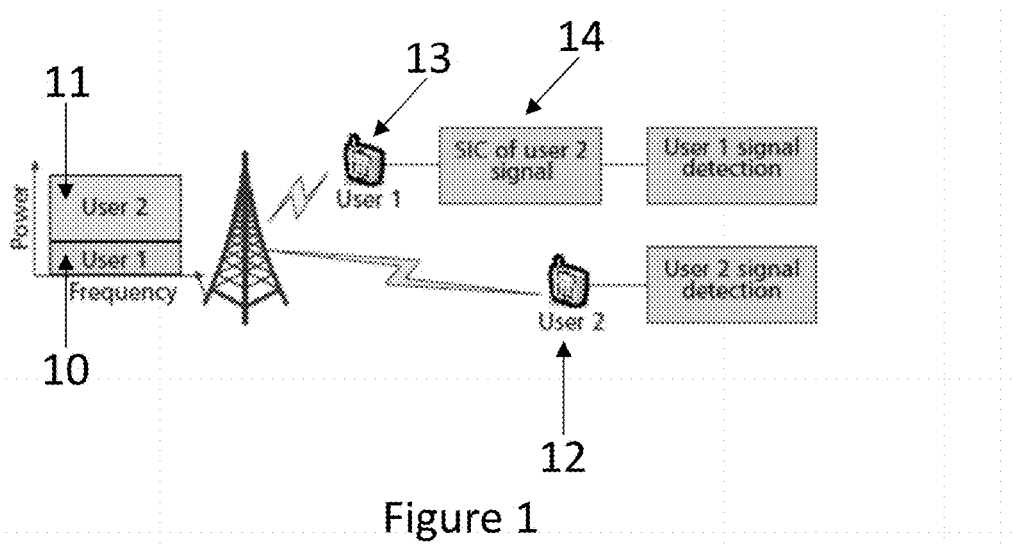
FIG. 1 illustrates a NOMA downlink.
Figure 2:
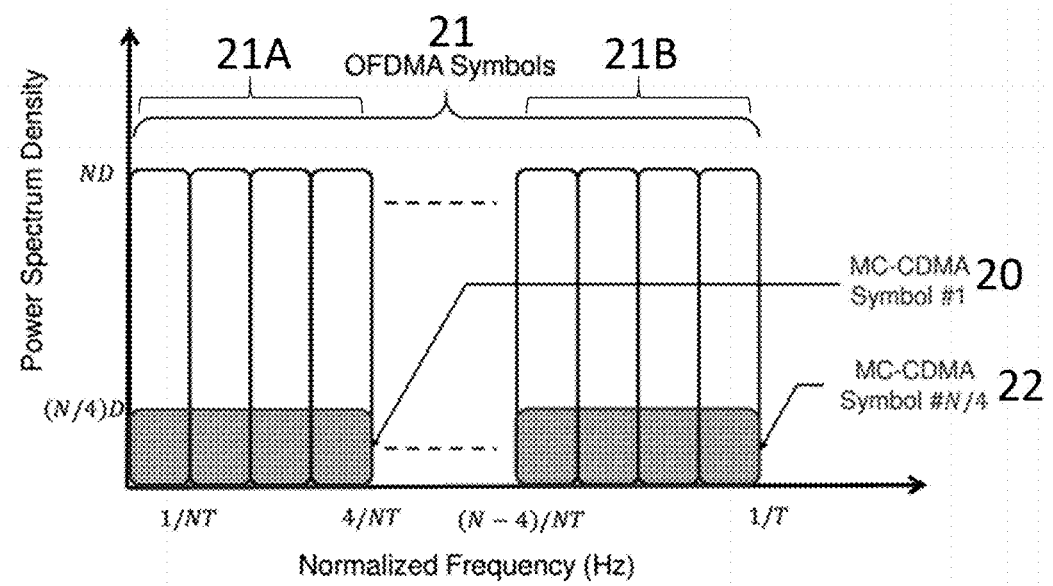
FIG. 2 illustrates superposed signals according to an embodiment.

Turning to FIG. 2, a first signal 20, 22 comprising an MC-CDMA symbol is combined (superposed) with a plurality, or stream, of a second signal (OFDMA symbols) 21. Preferably the first signal comprises a single MC-CDMA symbol. As illustrated in FIG. 2, first signal 20, 22 is combined with a portion 21A, 21B of second signal 21. The portion (spread length of the first signal) may comprise a plurality (N) of subcarriers of the second signal, and hence the superposition of the first signal on the portion of second signal is in the frequency domain as would be understood. The spread length is considered to be the number of OFDMA subcarriers of the second signal that the first signal overlaps with. FIG. 2 shows a spread length of 4 and hence there are N/4 first signals (20 and 22 of which are two examples).

The second signal may comprise QAM modulation such as 16, 32, 64QAM or higher. The first signal may comprise QPSK modulation.

As would be understood, it can be assumed that the first row of the Hadamard matrix, i.e., the sequence (1, 1, 1, ..., 1) is used for symbol spreading so that the spreading process comprises repetition coding. That is to say that a repetition coding length x results in an overlap of x subcarriers of the second signal 21. With a spread length of 4, and assuming that QPSK modulation is used for the first signal (MC-CDMA symbol), the data rate on the channel is increased by 0.5 bits per OFDMA subcarrier. This is because a QPSK symbol (20, 22) superposed (combined) with an OFDMA symbols carries 2 bits. Since, in FIG. 2, each symbol of the first signal is spread over 4 subcarriers of the second signal, the superposition increases the transmitted bit rate by 0.5 bits per subcarrier. If the spread length of each symbol of the first signal is increased to 8, the data rate increase is 0.25 bits per OFDMA subcarrier. In general, a smaller value (below 4) of the repetition code decreases performance, and a higher value (above 8) decreases data rate. The preferred repetition code length is 4 or 8.

Amplitude scaling may be used to preserve the symbol energy and the minimum Euclidean distance of the original symbol stream:

Denoting the OFDMA symbols by $a_n$, $1 \leq n \leq N$ where n is the subcarrier index, the MC-CDMA symbols by $b_m$ with $1 \leq m \leq M$ and the WH (Walsh Hadamard) sequences used for frequency-domain signal spreading by $W_m=(w_{1,m}, w_{m,2}, \ldots, w_{m,N})$ for $m=1, 2, \ldots, M$, the transmitted second signal on carrier n can be written as:

$$x_n = a_n + \frac{1}{\sqrt{N}} \sum_{m=1}^{M} w_{m,n} b_m$$

for $n=1, 2, \ldots, N$. The components of the WH sequences are $\pm 1$. The division by $\sqrt{N}$ in this equation is to preserve the symbol energy during the spectral spreading process.

As would be understood, WH sequences are rows of the Hadamard matrix given by:

$$H_2 = \begin{bmatrix} +1 & +1 \\ +1 & -1 \end{bmatrix}$$

and $$H_{2N} = \begin{bmatrix} H_N & H_N \\ H_N & -H_N \end{bmatrix}.$$

The matrix $H_4$ is given by:

$$H_4 = \begin{bmatrix} +1 & +1 & +1 & +1 \\ +1 & -1 & +1 & -1 \\ +1 & +1 & -1 & -1 \\ +1 & -1 & -1 & +1 \end{bmatrix}$$

The first WH sequence is the first row of this matrix, which is: $W_1=[+1\ +1\ +1\ +1]$. Spreading of a symbol with this sequence corresponds to a repetition code of length 4.

The transmission scheme as shown in FIG. 2 that superposes a first signal 20, 22, preferably a single signal comprising a short repetition code length, onto a portion of a second signal 21A, allows joint detection of the two signals at a receiver as will be explained.

Figure 3:
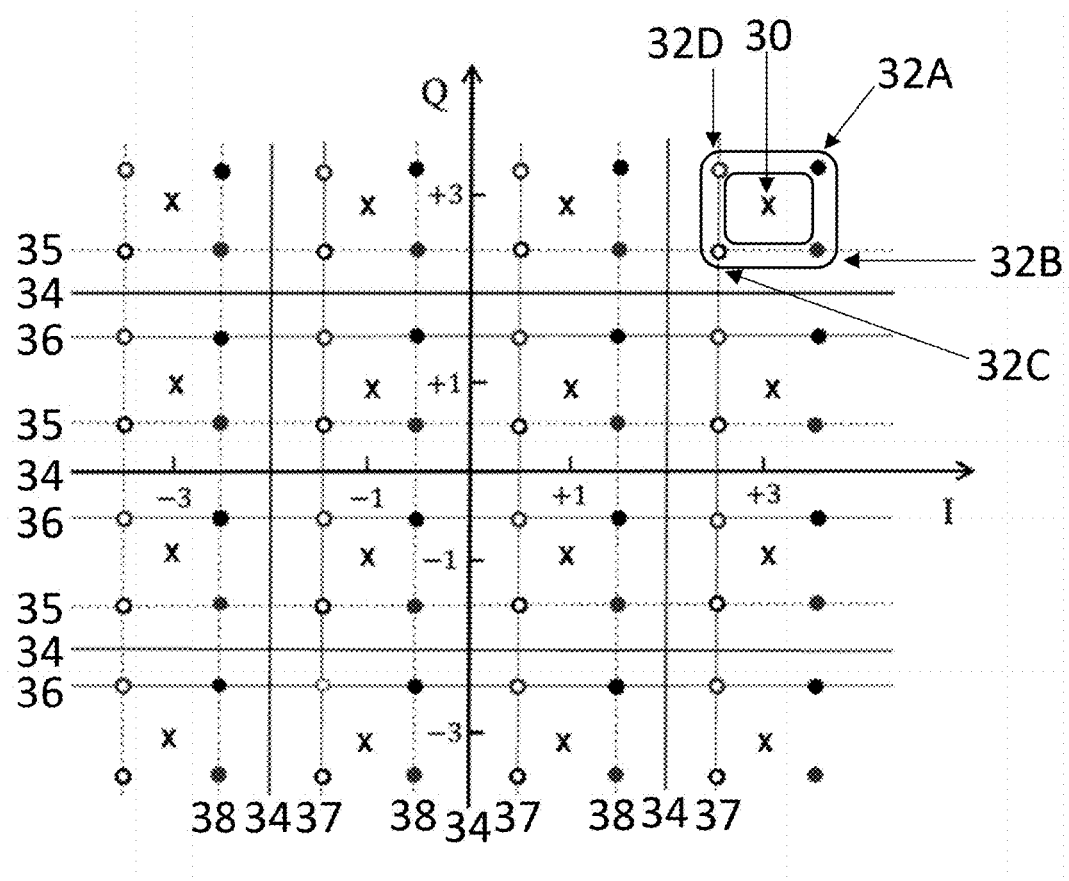
FIG. 3 illustrates a constellation diagram of a second (16QAM) signal and a first (QPSK) signal according to an embodiment.

As would be understood, exhaustive-search implementation of a Maximum-Likelihood (ML) receiver is very complex to implement in relation to processing power and general resources required. At a corresponding receiver for the above transmission scheme, threshold detection is performed as illustrated in FIG. 3.

In the following, 16QAM modulation is assumed for the second (preferably OFDMA) signal 21, and QPSK modulation with ½ amplitude scaling and repetition code length 4, for the first signal 20, 22 that is superposed to the second signal.

Consider a symbol block $a_k, k=1, 2, \ldots$ (21) taking its values from the 16QAM signal constellation. Each one of these symbols is transmitted at one subcarrier (for $k=1, 2, \ldots, N$, symbol $a_k$ is transmitted on the kth subcarrier).

The set of N subcarriers of the second signal 21 is split into N/4 groups of 4 subcarriers each (e.g. 21A, 21B). Focusing on the first group (portion) 21A, the transmitted symbols (one per subcarrier of portion 21A) are denoted $\{a_1,$ $a_2, a_3, a_4\}$. By adding the repetition-coded QPSK symbol (denoted b), the signals transmitted on these four carriers can be written as:

$$x_1 = a_1 + b/2$$

$$x_2 = a_2 + b/2$$

$$x_3 = a_3 + b/2$$

$$x_4 = a_4 + b/2$$

As can be seen, each subcarrier of second signal portion 21A transmits a different (OFDMA) symbol of the second signal 21 but the same (QPSK) symbol of the first signal 20.

As shown in FIG. 3, the signals transmitted on the N/4 groups of subcarriers form a 64QAM signal constellation whose minimum distance is 6 dB lower than the original 16QAM modulation used for OFDMA. The repetition code of length 4 fully recovers this loss, and the asymptotic BER performance with maximum-likelihood (ML) detection is the same as that of the 16QAM modulation before superposition as will be explained.

The crosses (30) represent 16QAM modulation used for second signal (OFDMA) users. The minimum distance is $\delta_0=2$. The addition of a QPSK symbol (32A, 32B, 32C, 32D) to a 16-QAM symbol leads to a 64QAM constellation formed of all of the circular points of FIG. 3. It is clear that the minimum distance of this constellation is $\delta_1=\delta_0/2=1$. Reduction of a distance by a factor of 2 is a reduction of 6 dB as is known. However, with a repetition code of length 4, symbol decisions are made block by block, and the squared minimum distance in the code space is:

$$\delta_2^2 = \delta_1^2 + \delta_1^2 + \delta_1^2 + \delta_1^2 = 4\delta_1^2 + \delta_0^2$$

This shows that the minimum distance is as in the original 16QAM (second) signal constellation. In other words, the repetition code recovers the 6 dB loss due to the superposition of QPSK symbols.

Regarding transmit power, if the power of the 16QAM symbols (second signal) is 10 and the power of the QPSK symbols (first signal) is 2, the power of the $x_k$ symbols is 10.5, and this means that the cost of adding 0.5 bits to each 16QAM symbol is only:

$$10 \cdot \log_{10}(10.5/10) = 0.2 \text{ dB}.$$

Taking an ideal maximum-likelihood receiver, the received combined signal on subcarrier k is $r_k = x_k + n_k$, where $n_k$ represents additive white Gaussian noise (AWGN). The received signal block $(r_1, r_2, r_3, r_4)$ is used to jointly detect the block of 5 symbols $(a_1, a_2, a_3, a_4, b)$, which represents $(a4k-3, a4k-2, a4k-1, a4k, bk)$, where k is the index of the transmitted symbols. The ML receiver minimizes the following metric:

$$\text{Min}\{|r_1-a_1-b/2|^2+|r_2-a_2-b/2|^2+|r_3-a_3-b/2|^2+|r_4-a_4-b/2|^2\}$$

where the minimization is performed over all possible values of the symbol block $(a_1, a_2, a_3, a_4, b)$ i.e. (a4k−3, a4k−2, a4k−1, a4k, bk). Exhaustive search involves the computation of $4(M)^4$ metrics and their comparisons, where M is the number of points of the QAM signal constellation (M=16 for 16QAM). As can be seen, the sum of four squares has to be calculated. This is too complex. The following simplified receiver is proposed which uses threshold detection scheme.

The simplified receiver comprises a plurality of steps, the number of steps corresponding to the repetition code length of a first signal superposed on a portion of a second signal, the first and second signals being used in the creation of a received combined signal. Each step of the simplified receiver scheme comprises threshold detection of the (16QAM) symbol block of the portion of the second signal that is superposed by the symbol of the (QPSK) first signal (4 subcarriers as we have a repetition code length 4 in the first signal, denoted by ($a_1$, $a_2$, $a_3$, $a_4$) in the below) conditional on the 4 values of the (QPSK) symbol of the first signal (denoted by b in the below).

Taking the example of a 16QAM second signal and a QPSK first signal comprising repetition code length 4 (the first signal is superposed onto a 4 subcarrier symbol block of the second signal):

The solid lines (34) denote the thresholds (−2.0, 0.0, +2.0) for a 16QAM constellation as would be understood.

In FIG. 3 it is shown that for each superposed QPSK symbol, there may be 4 positions (32A, 32B, 32C, 32D) in the effective 64QAM constellation equivalent to shifting the 16QAM symbol by (1+j)/2, (1−j)/2, (−1−j)/2 and (−1+j)/2 as would be understood.

In each step there are 4 different decisions made to determine the 4 subcarriers (symbols) of the first signal and the symbol of the second signal. The steps are labelled 1, 2, 3, 4. However, the steps may be performed in any order.

Step 1:

In this step, threshold detection conditional on b=1+j (32A) takes place. Received symbol block ($r_1$, $r_2$, $r_3$, $r_4$) is sent to a threshold detector. The thresholds for the 16QAM second signal are shifted upwards by 0.5 in both the horizontal and vertical directions (real and imaginary) due to the 0.5 amplitude scaling of the first (QPSK) signal.

The thresholds for the second signal for this step become (−1.5, +0.5, +2.5) as shown by 35 and 37 on FIG. 3. The resulting decisions from the threshold detection of this step are denoted ($\hat{a}_1^1$, $\hat{a}_2^1$, $\hat{a}_3^1$, $\hat{a}_4^1$), or (a4k−31,a4k−21,a4k−11, a4k1).

Step 2:

In this step, threshold detection conditional on b=1−j (32B) takes place. Received symbol block ($r_1$, $r_2$, $r_3$, $r_4$) is sent to a threshold detector. The thresholds for the 16QAM second signal are shifted upwards by 0.5 in the horizontal (real) direction and downwards by 0.5 in the vertical (imaginary) direction due to the 0.5 amplitude scaling of the first (QPSK) signal.

The thresholds for the real parts (horizontal direction) of the second signal for this step become (−1.5, +0.5, +2.5) as shown by 37 on FIG. 3. The thresholds for the imaginary parts (vertical direction) of the second signal are (−2.5, −0.5, +1.5) as shown by 36 on FIG. 3. The resulting decisions from the threshold detection of this step are denoted ($\hat{a}_1^2$, $\hat{a}_2^2$, $\hat{a}_3^2$, $\hat{a}_4^2$).

Step 3:

In this step, threshold detection conditional on b=−1−j (32C) takes place. Received symbol block ($r_1$, $r_2$, $r_3$, $r_4$) is sent to a threshold detector. The thresholds for the 16QAM second signal are shifted downwards by 0.5 in both the horizontal and vertical (real and imaginary) directions due to the 0.5 amplitude scaling of the second (QPSK) signal.

The thresholds for the second signal for this step become (−2.5, −0.5, +1.5) as shown by 36 and 38 on FIG. 3. The resulting decisions from the threshold detection of this step are (a4k−31,a4k−21,a4k−11,a4k1) denoted ($\hat{a}_1^3$, $\hat{a}_2^3$, $\hat{a}_3^3$, $\hat{a}_4^3$).

Step 4:

In this step, threshold detection conditional on b=−1+j (32D) takes place. Received symbol block ($r_1$, $r_2$, $r_3$, $r_4$) is sent to a threshold detector. The thresholds for the 16QAM second signal are shifted downwards by 0.5 in the horizontal (real) direction and upwards by 0.5 in the vertical (imaginary) direction due to the 0.5 amplitude scaling of the first (QPSK) signal.

The thresholds for the real parts of the second signal for this step become (−2.5, −0.5, +1.5) as shown by 38 on FIG. 3. The thresholds for the imaginary parts of the second signal are (−1.5, +0.5, +2.5) as shown by 35. The resulting decisions from the threshold detection of this step are denoted ($\hat{a}_1^4$, $\hat{a}_2^4$, $\hat{a}_3^4$, $\hat{a}_4^4$).

Additionally, in each step above, an error signal is computed which is the difference between the threshold detector input and output corresponding to each of the decisions made in each step. Accordingly, an error signal block is derived ($e_1^i$, $e_2^i$, $e_3^i$, $e_4^i$) where i is the step index and $e_k^i = r_k - \hat{a}_k^i - b_i$ where $b_i$ represents the QPSK symbol value corresponding to that step.

Subsequent to each step being completed, and the corresponding error signal block being derived, the decision on the transmitted block is made by evaluating the metric $\{|e_1^i|^2 + |e_2^i|^2 + |e_3^i|^2 + |e_4^i|^2\}$ for i=1, 2, 3, 4 and selecting the i index, which minimizes this metric. When we know the i index, we have the first signal values, and the value of b as provided by the step in question.

In alternative embodiments, with a repetition code of length 8, the number of 16QAM symbols per block would be 8, say ($a_1$, $a_2$, $a_3$, $a_4$, $a_5$, $a_6$, $a_7$, $a_8$) and the metric evaluated will be of the form $\{|e_1^i|^2 + |e_2^i|^2 + |e_3^i|^2 + |e_4^i|^2 + |e_5^i|^2 + |e_6^i|^2 + |e_7^i|^2 + |e_8^i|^2\}$, where i=1, 2, 3, 4 is the step index in the detector as discussed above. If the repetition coded symbol is not a QPSK symbol, but let us say a 16QAM symbol, the i index would take 16 values instead of 4.

Alternatively, or additionally to amplitude scaling, a rotation (phase) function may be applied to the second signal. This is another way of ensuring that the minimum Euclidian distance is retained. As would be understood, there is no energy change when phase rotation occurs.

Figure 4:
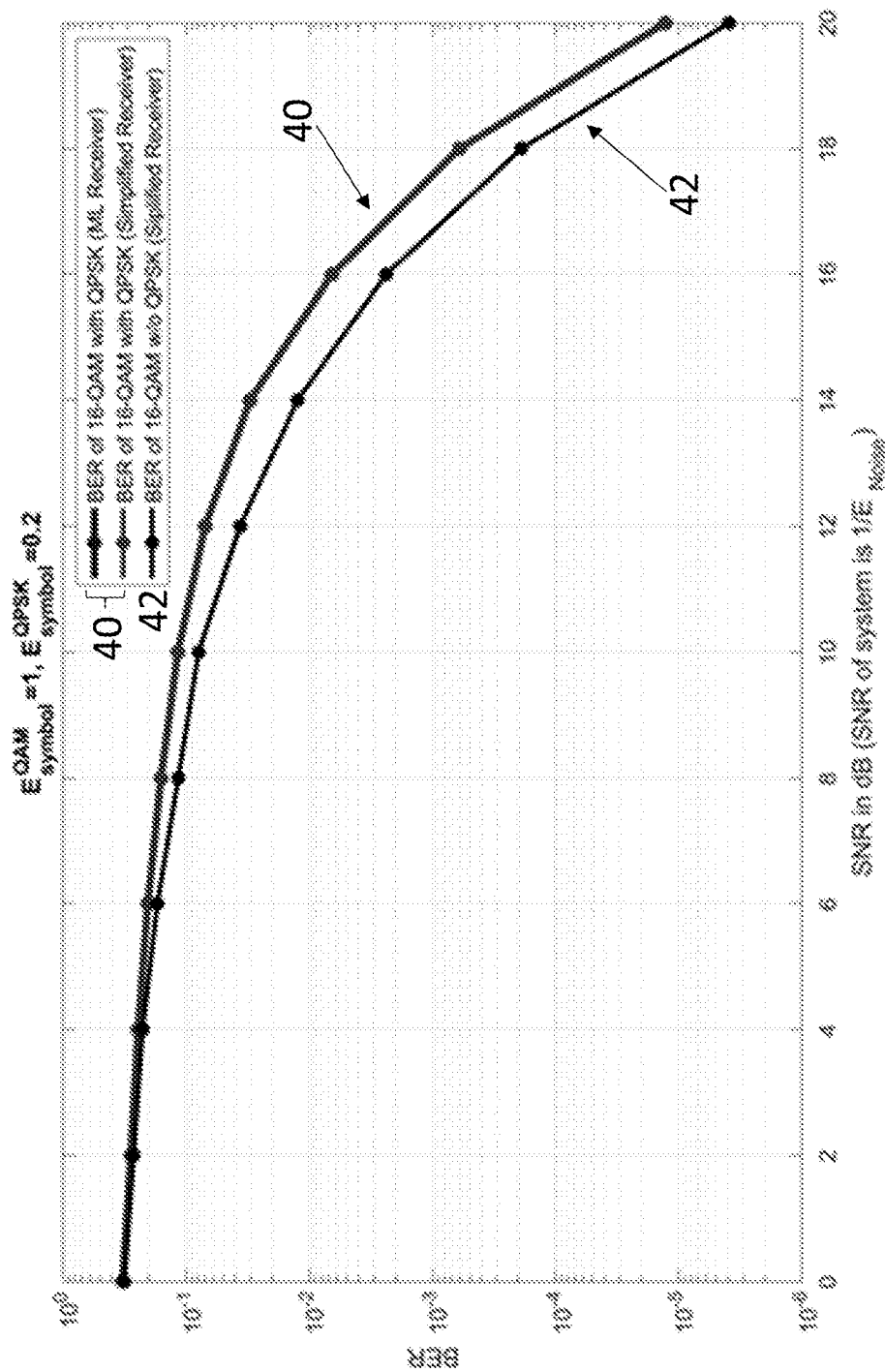
FIG. 4 illustrates a simulation of AWGN channels using the disclosed new scheme.

Turning to FIG. 4, a simulation of AWGN channels is shown. For 16QAM with superposed QPSK (see 40—both with an ML receiver or the disclosed simplified receiver), the SNR degradation compared to interference free 16QAM (42) does not exceed 0.5 dB at BER values below $10^{-4}$. Asymptotically, the degradation converges to 0.2 dB.

FIGS. 2 to 4 are shown in the frequency domain. In an alternative, signal spreading (superposition) may take place in the time domain instead of the frequency domain. In this case, all user signals are single-carrier signals which reduces their peak-to-average power ratio (PAPR). This is because it is assumed that a single subcarrier is assigned to each OFDMA (second signal) user. If this is the case, then the signals of OFDMA users are single-carrier signals. Further, if the spreading of (the overloaded QPSK first signal) symbols is carried out in the time domain, this means that the spread symbol energy is located on a single subcarrier, and the signal of these users is also single-carrier.

This property is particularly important when the NOMA scheme is used for the uplink. It is well known that single-carrier signals have a smaller peak-to-average power ratio (PAPR) than multi-carrier signals, and the transmit power amplifier in the user device can be used more efficiently in this case.

An advantage of time domain spreading is that single carrier is affected less by relevant power amplifier non-linearities as would be understood.

In the time domain, instead of spreading over, for example, 4 or 8 subcarriers of the second signal in the frequency domain, spreading is done over, for example, 4 or 8 symbol durations of the second signal in the time domain. In this instance, the above equations:

$$x_1 = a_1 + b/2$$
$$x_2 = a_2 + b/2$$
$$x_3 = a_3 + b/2$$
$$x_4 = a_4 + b/2$$

represent the signals transmitted at 4 consecutive symbol periods on a given subcarrier of the second signal instead of signals transmitted on 4 different subcarriers at a given symbol period of the second signal. The rest of the new technique operates in the same manner as above as described in relation to the frequency domain.

As has been shown, only one symbol (MC-CDMA) of the first signal need be superposed to a portion of the symbols (OFDMA) of the second signal. This allows a simplified receiver to achieve maximum likelihood performance using threshold detection with a relatively small number of computations and comparisons. This further provides reduced sensitivity to frequency selective fading.

Conversely, the previous scheme of superposing a plurality of MC-CDMA signals that are spread over the entire band onto OFDMA signals such that each MC-CDMA signal interferes with all OFDMA signals. This results in sensitivity to frequency selective fading. This also requires a relatively large number of MC-CDMA symbols to be superposed to achieve a significant channel overload performance (capacity increase). Further, with such a scheme, the use of a maximum-likelihood receiver is very resource heavy which results in iterative cancellation receivers being used instead. These receivers are suboptimum because iterative receivers based on interference cancellations will always leave some interference even after all iterations are complete.

The various methods described above may be implemented by a computer program product. The computer program product may include computer code arranged to instruct a computer or processor to perform the functions of one or more of the various methods described above. The computer program and/or the code for performing such methods may be provided to an apparatus, such as a computer or a processor, on a computer readable medium or computer program product. The computer readable medium may be transitory or non-transitory. The computer readable medium could be, for example, an electronic, magnetic, optical, electromagnetic, infrared, or semiconductor system, or a propagation medium for data transmission, for example for downloading the code over the Internet. Alternatively, the computer readable medium could take the form of a physical computer readable medium such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

An apparatus such as a computer or processor may be configured in accordance with such code to perform one or more processes in accordance with the various methods discussed herein. Such an apparatus may take the form of a data processing system. Such a data processing system may be a distributed system. For example, such a data processing system may be distributed across a network.

What is claimed is:

1. A method of transmission for increasing communication channel capacity comprising:
  superposing a first signal on a portion of a second signal to form a combined signal, wherein:
    the first signal comprises a repetition coded signal;
    a plurality of subcarriers is used to transmit the second signal;
    a portion of the plurality of subcarriers is used to transmit the portion of the second signal, the portion of the plurality of subcarriers comprising multiple ones of the plurality of subcarriers; and
    superposing the first signal on the portion of the second signal comprises spreading the first signal over the portion of the plurality of subcarriers used to transmit the portion of the second signal; and
  transmitting the combined signal.

2. The method of claim 1 wherein the portion of the second signal comprises a portion of the symbol durations of the second signal.

3. The method of claim 1 wherein the first signal is amplitude scaled prior to superposing.

4. The method of claim 1 wherein the first signal is phase rotated prior to superposing.

5. The method of claim 3 wherein the amplitude scaling preserves the symbol energy and minimum Euclidian distance of the original symbol streams.

6. The method of claim 1 wherein the repetition code length defines the portion of the second signal that the first signal is superposed on.

7. The method of claim 6 wherein the portion comprises a number of symbols of the second signal.

8. The method of claim 1 wherein the second signal and the first signal are manipulated in the frequency domain.

9. The method of claim 1 wherein the second signal and the first signal are manipulated in the time domain.

10. The method of claim 1 wherein only a single symbol of the first signal is superposed on the portion of the second signal.

11. A non-transitory computer readable medium comprising computer readable instructions that when executed by a processor, cause the processor to perform the method according to claim 1.

* * * * *